US007077928B2

(12) United States Patent
Bethune

(10) Patent No.: US 7,077,928 B2
(45) Date of Patent: Jul. 18, 2006

(54) PROCESS FOR THE MANUFACTURE OF A LABEL STOCK CARRIER

(75) Inventor: Alain Bethune, Savigny (FR)

(73) Assignee: L'Oreal, Paris (FR)

( * ) Notice: Subject to any disclaimer, the term of this patent is extended or adjusted under 35 U.S.C. 154(b) by 158 days.

(21) Appl. No.: 10/705,918

(22) Filed: Nov. 13, 2003

(65) Prior Publication Data

US 2004/0161573 A1 Aug. 19, 2004

Related U.S. Application Data

(60) Provisional application No. 60/438,323, filed on Jan. 7, 2003.

(30) Foreign Application Priority Data

Nov. 14, 2002 (FR) .................................. 02 14231

(51) Int. Cl.
*B32B 37/00* (2006.01)
*B65C 9/18* (2006.01)

(52) U.S. Cl. ...................... 156/248; 156/252; 156/253; 156/257; 156/268; 156/269; 156/511; 156/517; 83/875; 83/880

(58) Field of Classification Search ................ 156/247, 156/344, 252, 253, 257, 268, 279, 511, 512, 156/517, 543, 248, 256, 259; 428/42.3; 83/875, 83/880
See application file for complete search history.

(56) References Cited

U.S. PATENT DOCUMENTS 5,624,520 A * 4/1997 Nedblake et al. ........... 156/249

FOREIGN PATENT DOCUMENTS

| | | |
|---|---|---|
| DE | 2212995 | 9/1973 |
| FR | 2789971 | 8/2000 |
| FR | 2789972 | 8/2000 |

* cited by examiner

*Primary Examiner*—Linda Gray
(74) *Attorney, Agent, or Firm*—Oblon, Spivak, McClelland, Maier & Neustadt, P.C.

(57) ABSTRACT

A process for the manufacture of a label stock carrier from a multi-layer structure having a carrier strip covered on its two faces by respective first and second adhesive films designed to be cut to form a first and second series of labels respectively. The second adhesive film is temporarily separated from the carrier strip during the cutting operation on the first adhesive film to form the first series of labels. In accordance with another aspect, the labels of the first series of labels are superposed and disposed within corresponding peripheries of the second series of labels.

23 Claims, 2 Drawing Sheets

PROCESS FOR THE MANUFACTURE OF A LABEL STOCK CARRIER

CROSS-REFERENCE TO RELATED APPLICATIONS

This document claims priority to French Application Number 02 14231, filed Nov. 14, 2002 and U.S. Provisional Application No. 60/438,323, filed Jan. 7, 2003, the entire content of which are hereby incorporated by reference.

FIELD OF THE INVENTION

The present invention relates to a process for the manufacture of a carrier for adhesive label stock designed, for example, to be affixed to bottles or other packaging. The invention can be particularly advantageous for bottles or other packaging used notably in the cosmetics industry. The invention relates more particularly to the manufacture of a carrier incorporating a carrier strip covered on its two faces by adhesive labels, with such a carrier being designed for use, for example, in accordance with the continuous labeling processes described in French patents FR 2,789,971 and 2,789,972.

BACKGROUND OF THE INVENTION

Discussion of Background

A known process for the manufacture of a carrier for label stock is disclosed in German patent 2,212,995. According to this known process, a multi-layer structure incorporating a carrier strip covered on its two faces by adhesive films designed to form labels passes successively through a first printing-and-cutting station enabling labels to be formed on one of the faces. The carrier then passes through a second printing-and-cutting station enabling labels to be made on the other face.

The cutting operation for the adhesive films has to be performed very precisely to avoid damaging the carrier strip, and adjustment of the cutting blades defining the profile of the labels and of the counter-blocks designed to support the pressure of the blades is delicate. In addition, the difficulty of cutting is increased by the presence of the layers of adhesives bonding the films to the carrier strip, the thickness of which can be on the order of 25 to 30% of the total thickness. These layers of adhesive are compressible and pose a risk of flowage. Further, the adhesive thickness is typically known only within wide tolerances, and the thickness of each layer is liable to vary, for example, between 17 and 23 μm during production for a nominal thickness of 20 μm.

Thus, even if care or precautions are taken, there remains a risk that the carrier strip will be cut when the thickness of the adhesive layers is minimal, which in turn creates a risk that the carrier strip will break during the labeling operation in the packaging line.

There is also a risk, when the thickness of the adhesive layers is large, that the outline of the label will be inadequately cut, thereby impeding its subsequent detachment.

In addition, there is a risk that the adhesive will flow on either side of the label and create unwanted areas of adherence during the reeling operation.

SUMMARY OF THE INVENTION

The invention aims to remedy all or some of the above drawbacks. The invention achieves this by virtue of a process for the manufacture of a label stock carrier from a multi-layer structure incorporating a carrier strip covered respectively on its two faces by a first and a second adhesive film designed to be cut to form first and second series of labels respectively. In accordance with the invention, the second adhesive film is temporarily separated from the carrier strip during the cutting operation on the first adhesive film to form the first series of labels.

By virtue of the invention, the labels located on one side of the carrier strip can be cut with a lower risk of cutting into the carrier strip, incomplete cutting of the outline, or flowage of the adhesive, because the full thickness present between the cutting tool and the corresponding counter-block is reduced by the absence of the second adhesive film at this time.

Temporary separation of the second film can be accomplished, for example, by means of rollers having an anti-tack surface.

In a preferred embodiment of the invention, cutting of the second film is carried out in a manner such that the outline of each label in the first series of labels lies inside the outline of each label in the second series. Thus, when the second film is cut to form the second series of labels, the presence of cut labels in the first adhesive film between the blade of the cutting tool and the corresponding counter-block is avoided, so that the risk of damaging the carrier strip, inadequate cutting of the label outline or flowage of the adhesive is reduced even further.

Before the labels are cut, the multi-layer structure can, for example, have a center carrier strip, having a thickness, for example, of approximately 50 μm. Further by way of example, the carrier strip can be covered on each of its faces by a layer designed to facilitate detachment of the adhesive labels, for example, a layer of silicone approximately 1 μm thick. On either side of the carrier strip thus treated are placed the first and second adhesive films, the thickness of the film itself being, for example, approximately 30 μm and that of the associated adhesive layer approximately 20 μm.

The film may, for example, be made of polyolefin, notably polyethylene or polypropylene, or polyethylene terephtalate. However, this list is not to be considered exhaustive or limiting.

Each label in the first series of labels can, for example, be designed to be affixed to the back of a container and the corresponding label in the second series of labels can be designed to be affixed to the front of the container.

As a variant, the labels in the first series of labels can be designed to be affixed to a first type of packaging and those in the second series of labels can be designed to be affixed to a second type of packaging.

The labels located on one side of the carrier strip can, for example, have an outline substantially similar, substantially homothetic, or substantially the same shape as that of the labels located on the other side of the carrier strip with, for example, a relatively small offset between at least one edge of one of the labels and that of the corresponding label located on the opposite side. By way of example, the offset of the at least one edge can be only slightly larger than the thickness of the cutting blade, for example, greater than or equal to approximately 1 mm.

A further object of the invention is to provide a label stock carrier designed to be fed continuously to a labeling station, obtained by implementation of the process as described above.

According to another object of the invention, a label stock carrier is provided having first and second series of detachable adhesive labels arranged on both sides of a carrier strip, the labels in the first series having an outline similar to that of the labels in the second series, and the labels in the first series being superimposed on the labels in the second series, with an offset between their edges.

A further object of the invention is to provide a process for continuous feeding of a labeling line with a label stock carrier obtained by implementation of the process as described above.

BRIEF DESCRIPTION OF THE DRAWINGS

Other characteristics and advantages of the invention will become apparent from the following detailed description, particularly when considered in conjunction with the drawings in which.

DETAILED DESCRIPTION OF THE PREFERRED EMBODIMENTS

Figure 1:
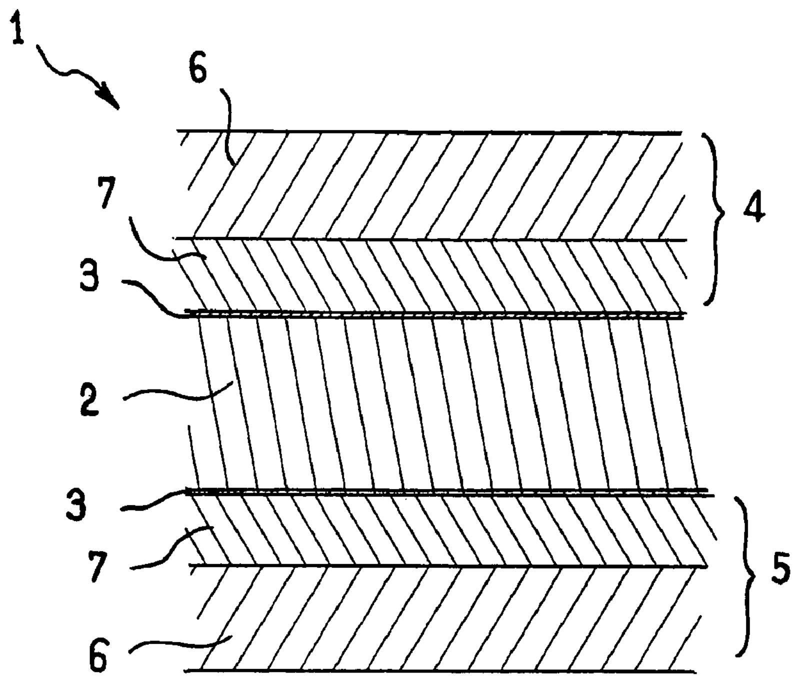
FIG. 1 is a schematic cross-section of an example of an initial multi-layer structure.

To produce a label stock carrier according to the invention, the starting point can be, for example, the multi-layer structure 1 shown schematically in FIG. 1. This arrangement can incorporate a central carrier strip, for example, with a thickness of 50 μm, covered on each of its faces by a layer of anti-tack material 3, for example, a layer of silicone approximately 1 μm thick.

The multi-layer structure 1 also includes the first and second adhesive films 4 and 5 placed on either side of the carrier strip 2, with each adhesive film 4 or 5 including a film 6 serving as the print medium and an associated layer of adhesive 7.

The films 6 are, for example, made of thermoplastic material, for example, polyolefin or polyethylene terephtalate. The thickness of a film 6 is, for example, approximately 30 μm. The thickness of each adhesive layer 7 associated with a film 6 is, for example, approximately 20 μm.

Figure 2:
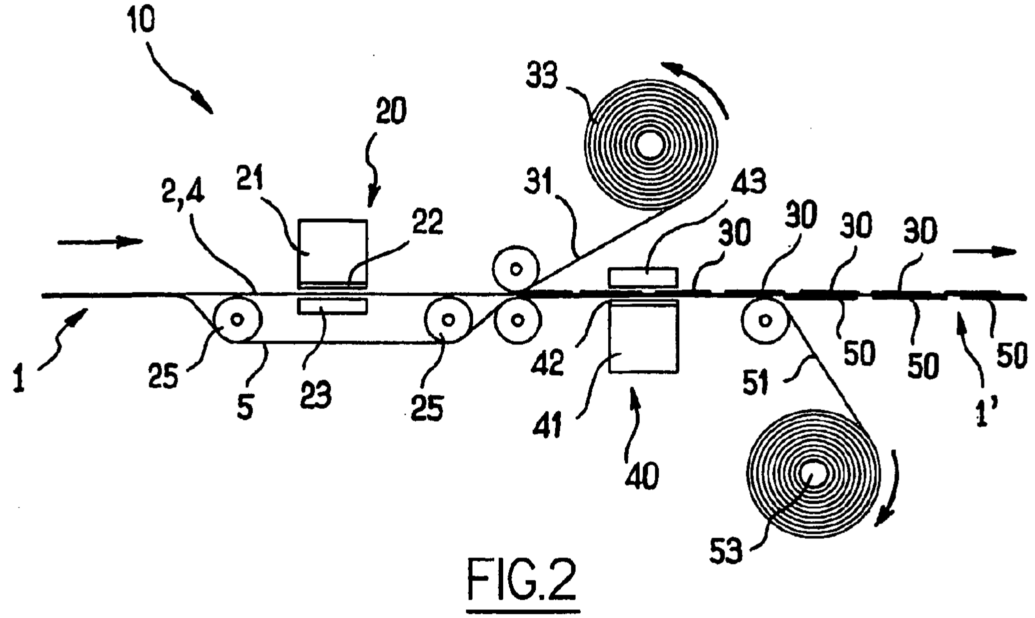
FIG. 2 is a schematic illustration of the cutting of labels according to a first exemplary embodiment of the invention.

To produce the labels, according to an exemplary embodiment of the invention, the multi-layer structure 1 stored in reel form is unwound and fed, after corona treatment if required and printing of the label content on the films 6, to the label cutting facility 10 illustrated diagrammatically in FIG. 2.

This facility 10 includes a first cutting station 20 designed to cut the first adhesive film 4 to form a first series of labels 30 and a second cutting station 40 designed to form a second series of labels 50 by cutting the second adhesive film 5.

The first cutting station 20 includes a cutting tool 21 known in itself and shown schematically, incorporating a cutting blade 22 having a profile corresponding to that of the label to be produced, and a counter-block 23 designed to support the pressure exerted by the cutting tool.

In a similar manner, the second cutting station 40 includes cutting tool 41 incorporating a cutting blade 42 and a counter-block 43.

According to an aspect of the invention, the second adhesive film 5 is temporarily separated from the carrier strip 2 before the first adhesive film 4 is cut, this separation being achieved, for example, by means of rollers 25 which rotate and have an anti-tack coating. By way of example, such a roller can have a silicone surface, a treated steel such as Balinite®, or a Teflon® coating. Thus, cutting of the labels 30 on the first adhesive film 4 bonded to the carrier strip 2 can be accomplished without the second adhesive film 5 being interposed between the blade 22 of the cutting tool 21 and the counter-block 23. After the labels 30 have been cut, the remaining part 31 of the first adhesive film 4 is removed, by being wound onto a roller 33, for example. The second adhesive film 5 rejoins the carrier strip 2 carrying the labels 30, and then the labels 50 are cut at the cutting station 40. The remaining part 51 extending around the latter set of labels is then removed by being wound onto a roller 53, for example.

A label stock carrier 1' is thus obtained which can be wound onto a spindle to form a reel, incorporating the carrier strip 2, with the first series of labels 30 on one of its faces and the second series of labels 50 on the opposite face. This label stock carrier 1' can be used in a continuous labeling process such as one of those described in either of the applicant's French patents FR 2,789,971 or 2,789,972.

Figure 4:
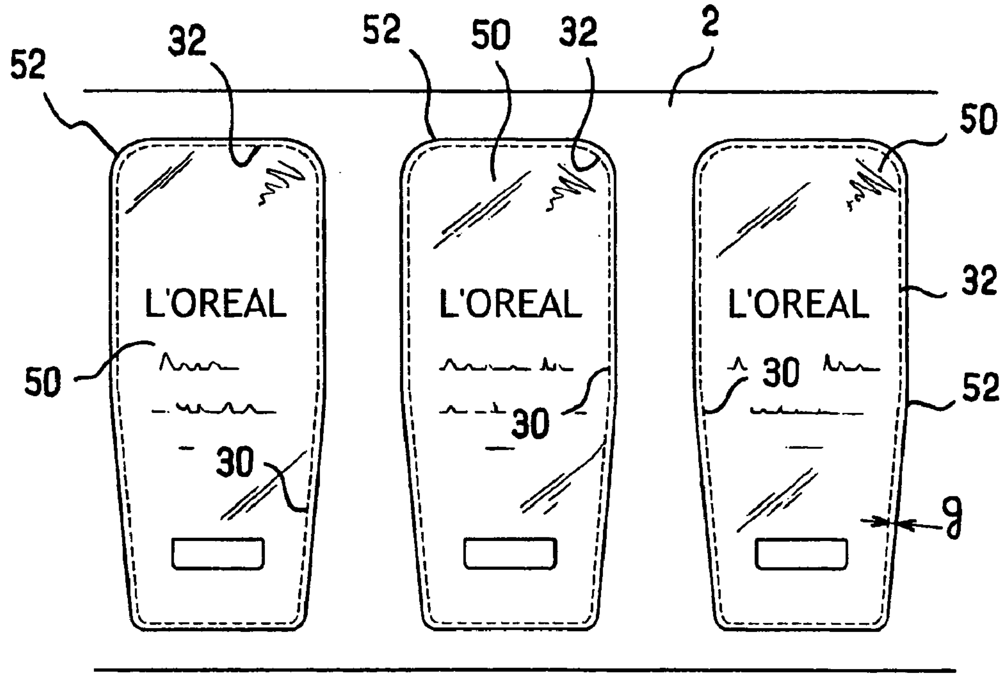
FIG. 4 is a schematic view in the direction of arrow IV in FIG. 3.

According to an advantageous aspect of the invention, the cutting of labels 50 at the second cutting station 40 can be carried out so that the outline 32 of the labels 30, shown dotted in FIG. 4, lies inside the outline 52 of the labels 50, with the gap g separating the edges of the two superimposed labels 30 and 50 preferably being greater than the thickness of the cutting blade 42. This gap g is, for example, approximately 1 mm or greater than 1 mm.

In addition, each label 30 can be centered relative to the label 50 with which it is associated, and the labels 30 and 50 can be positioned successively on each of the faces of the carrier strip 2 with a regular spacing.

Figure 3:
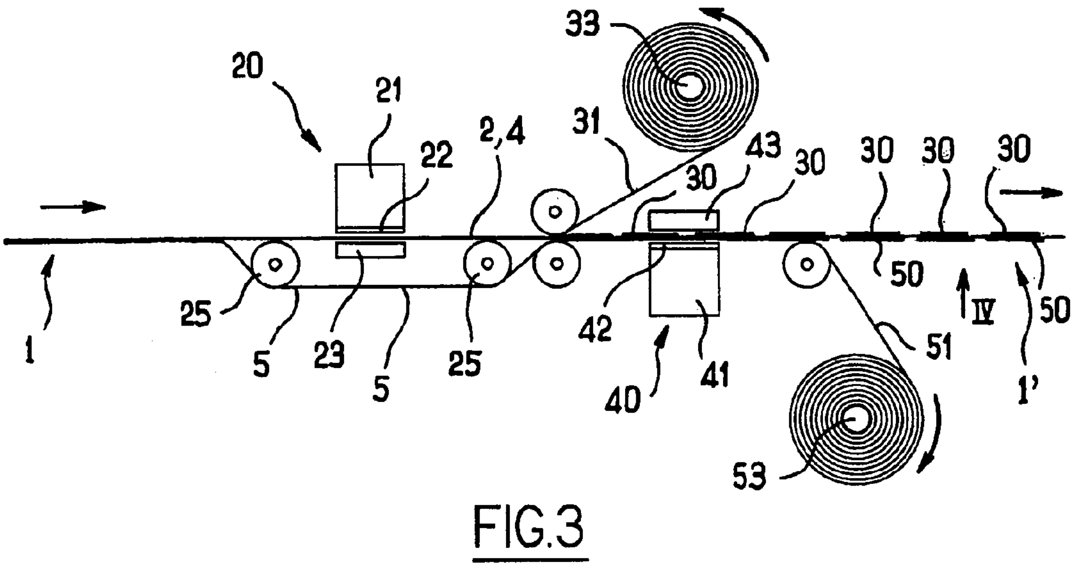
FIG. 3 is a view similar to FIG. 2 illustrating the cutting of labels according to a second exemplary embodiment of the invention.

It is to be understood that in the example illustrated in FIGS. 3 and 4, the labels 30 which are cut first are not interposed between the counter-block 43 and the blade 42 of the cutting tool 41 during the second cutting operation, and therefore do not impede cutting of the labels 50.

The cutting tool 41 can be fitted with at least one sensor, not shown, to allow the cutting of each label 50 to be synchronized with the movement of a label 30 to a predetermined position in which its outline 32 is entirely contained within that of the label 50 on the point of being cut.

Clearly, the invention is not limited to the examples described above. For example, the multi-layer structure can have layers of a thickness or type other than those given by way of example. Further, cutting of the labels can be accomplished by all known means and is not limited to the arrangement illustrated. In addition, although in the illustrated preferred embodiment labels are depicted in which one lies completely inside the other as shown in FIG. 4, at least some of the benefits of the invention can be achieved with other arrangements. For example, even if the edges are not offset, the separation of the second film during the cutting of the first film can nevertheless be advantageous. In addition, as noted earlier, labels for different types of packages can be provided by the respective first and second films and, where the labels are offset, advantageous benefits can be achieved where at least one edge is of one label is offset from at least one edge of the label on the opposite side of the corner strip. Additional advantages can be further obtained where one label lies entirely within the periphery of the other as described above.

Throughout the description, including the claims, expressions such as incorporating, comprising, including or having should be understood to be synonymous with incorporating or having at least one unless otherwise specified.

Obviously, numerous modifications and variations of the present invention are possible in light of the above teachings. It is therefore to be understood that, within the scope of the appended claims, the invention may be practiced otherwise than as specifically described below.

What is claimed as new and desired to be secured by Letters Patent of the United States is:

1. A process for manufacturing a label stock carrier comprising:

providing a multi-layer structure including a carrier strip covered on its two faces by a first adhesive film and a second adhesive film designed to be cut to form first and second series of labels respectively; and temporarily separating the second adhesive film from the carrier strip during a cutting operation of the first adhesive film on the carrier strip to form the first series of labels.

2. A process according to claim 1, further comprising:

cutting the second adhesive film to form the second series of labels such that an outline of each label in the first series lies inside an outline of each label in the second series.

3. A process according to claim 2, wherein the outlines of the first series of labels located on one side of the carrier strip are substantially similar to that of the second series of labels located on the other side of the carrier strip.

4. A process according to claim 3, wherein the first series of labels located on one side of the carrier strip have at least one edge which is offset from that of a corresponding label of the second series of labels located on the opposite side, the offset being greater than a thickness of a cutting blade used to cut the second series of labels.

5. A process according to claim 4, wherein the offset is at least approximately 1 mm.

6. A process according to claim 1, further comprising:

forming the second series of labels, wherein an outline of each label of the first series of labels is substantially similar to an outline of each label of the second series of labels.

7. A process according to claim 1, further comprising:

forming the second series of labels, wherein the first series of labels each have at least one edge which is offset from that of a corresponding label of the second series located on the opposite side, and wherein a cutting blade is used to cut the multi-layer structure to form said second series of labels, and wherein the offset is greater than a thickness of said cutting blade.

8. A process according to claim 7, wherein the offset is at least approximately 1 mm.

9. A process according to claim 1, further including performing a cutting operation on the second adhesive film to form the second series of labels, and wherein said first series of labels are superposed with respective labels of said second series of labels with at least a portion of a periphery of said second series of labels is disposed outside of a periphery of respective ones of said first series of labels such that cutting of said at least a portion of the periphery of the second series is performed outside of the periphery of the first series.

10. A process as recited in claim 1, further including performing a cutting operation on the second adhesive film to form the second series of labels such that peripheries of one of said first and second series of labels lies entirely within corresponding peripheries of the other of said first and second series of labels on the opposite side of said carrier strip.

11. A process as recited in claim 10, wherein said first and second series of labels have substantially the same shape.

12. A process as recited in claim 11, wherein said second series of labels are larger than said first series of labels such that peripheries of said labels of said first series lie within corresponding peripheries of said second series of labels.

13. A process as recited in claim 10, wherein said second series of labels are larger than said first series of labels such that peripheries of said labels of said first series lie within corresponding peripheries of said second series of labels.

14. A process for manufacturing a label stock carrier comprising:

providing a multi-layer structure including a carrier strip covered on a first face by a first adhesive film and on a second face by a second adhesive film;

performing a first cutting operation of the first adhesive film on the carrier strip to form a first series of labels on said first face when the second adhesive film is separated from the carrier strip;

performing a second cutting operation to form a second series of labels on said second face;

wherein said first and second cutting operations are performed such that labels of said first series are superposed with labels of said second series, wherein labels of said first series are smaller than labels of said second series and peripheries of labels of said first series lie within peripheries of labels of said second series.

15. A process as recited in claim 14, wherein with respect to a given portion of said multi-layer structure, said second cutting operation is performed after said first cutting operation.

16. A process according to claim 15, wherein said second cutting operation is performed with a cutting blade, and wherein a spacing between peripheries of labels of said first series and corresponding peripheries of labels of said second series is greater than a thickness of said cutting blade.

17. A process according to claim 15, wherein a spacing between peripheries of labels of said first series and corresponding peripheries of labels of said first series is at least approximately 1 mm.

18. A process according to claim 17, wherein labels of said first series have substantially the same shape as labels of said second series.

19. A process according to claim 18, further including, during said first cutting operation, temporarily separating a portion of said second adhesive film from said multi-layer structure at a location of said first cutting operation.

20. A process according to claim 15, further including, during said first cutting operation, temporarily separating a portion of said second adhesive film from said multi-layer structure at a location of said first cutting operation.

21. A process according to claim 14, wherein labels of said first series have substantially the same shape as labels of said second series.

22. A process according to claim 21, further including, during said first cutting operation, temporarily separating a portion of said second adhesive film from said multi-layer structure at a location of said first cutting operation.

23. A process according to claim 14, further including, during said first cutting operation, temporarily separating a portion of said second adhesive film from said multi-layer structure at a location of said first cutting operation.

* * * * *